Figure 1:
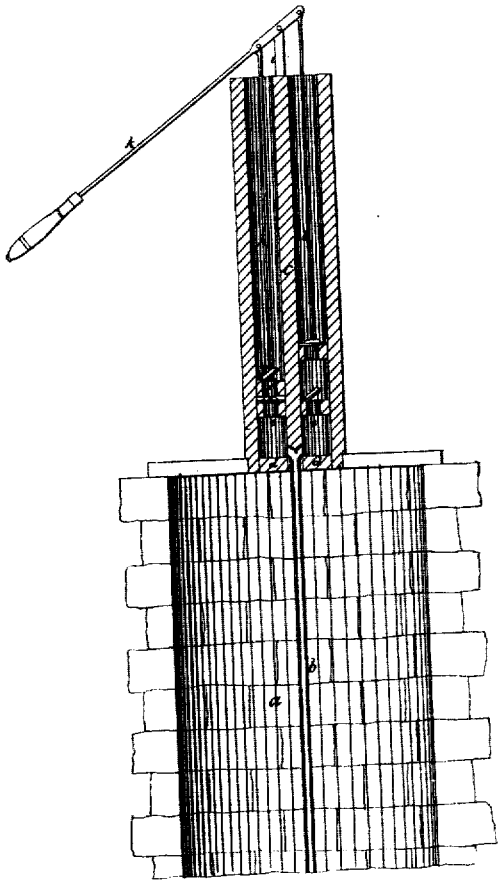
Figure 2:
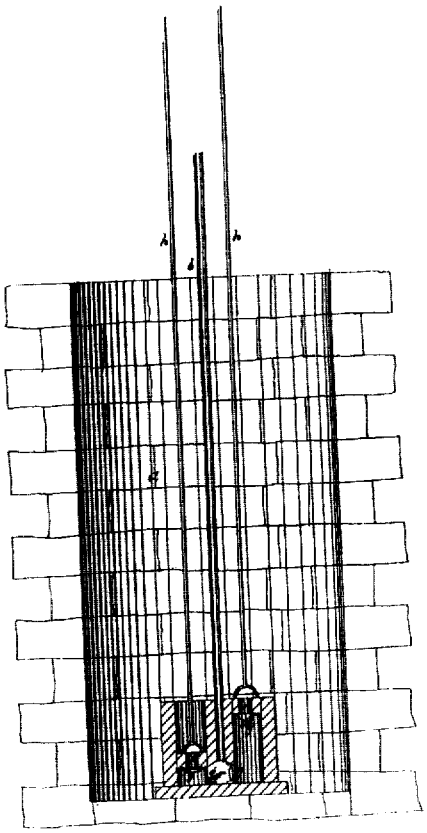

6606X

D. Smith,

Double-Acting Pump,

Patented June 13, 1831.

N. PETERS, PHOTO-LITHOGRAPHER, WASHINGTON, D. C.

June 13, 1831

Daniel Smith. of China State of New York · 6606X

Letters Patent,

The schedule referred to in these Letters Patent and making part of the same containing a description in the words of the said Daniel Smith himself of his improvement called the labour saving Pump To all to whom these presents shall come.
Be it known that I Daniel Smith, of the Town of China in the county of Genesee and State of New York, have invented a new and useful improvement in the art of raising water and that the following is a full and exact description of the construction and operation of the said machine, as invented or improved by me. which is called the labour saving pump The body of the pump is 13 or 14 feet long with two holes bored through it lengthways said holes to be lined with lead as far as the buckets play if necessary, near to the bottom are boxes with valves, just above said boxes are two buckets with valves connected with piston rods which are fastened to a handle supported by two ears fastened to said pump. At the bottom of said pump are two plugs above which is a leaden pipe fastened to the pump & running into the water, between said plugs and boxes is a communication from one hole to the other. Toward the top there is a spout to receive the water from each of the holes. or said pump may be but one foot in length, composed of lead or other materials suitable and made fast to a flat stone or plank, and set on the bottom of the well with long piston rods, with valves on the under side of the boxes which will press the water into a hollow place between the main holes through two holes which are covered with valves, and from thence up through a leaden pipe to the top of the well, where there is a platform on which is a standard to support the handle. It may likewise be used with one main hole in the pump, placed in the bottom of the well. with one piston rod and one bucket as aforesaid —

Witness
D. H. Wooster
Asa Hall

Daniel Smith

405 [illegible]

Patented 13 June 1831

[illegible]

E. 6
Chf.W.